United States Patent
Kim

Patent Number: 5,685,354
Date of Patent: Nov. 11, 1997

[54] AUTOMATICALLY RETRACTABLE SUN SHADE ASSEMBLY

[75] Inventor: Il-Kang Kim, Nam-Ku, Rep. of Korea

[73] Assignee: Sugil Kim, Los Angeles, Calif.

[21] Appl. No.: 697,045

[22] Filed: Aug. 19, 1996

Related U.S. Application Data

[63] Continuation-in-part of Ser. No. 558,120, Nov. 13, 1995, abandoned.

[51] Int. Cl.⁶ .................................................. A47H 1/00
[52] U.S. Cl. .......................................... 160/122; 160/903
[58] Field of Search .............................. 160/120, 122, 160/23.1, 24, 25, 370.22, 313, 323.1, 191, 903

[56] References Cited

U.S. PATENT DOCUMENTS

| | | |
|---|---|---|
| 1,299,986 | 4/1919 | Mattison . |
| 1,426,793 | 8/1922 | Vineberg . |
| 1,459,180 | 6/1923 | Hein ............................ 160/122 X |
| 1,461,478 | 7/1923 | Daniels . |
| 1,476,002 | 12/1923 | McPhaill . |
| 1,478,619 | 12/1923 | Simons et al. ................ 160/122 X |
| 1,735,699 | 11/1929 | Shelton . |
| 1,965,496 | 7/1934 | Hesse ............................... 160/313 |
| 2,561,188 | 7/1951 | Ferguson . |
| 2,851,303 | 9/1958 | McQueen . |
| 3,183,033 | 5/1965 | Stulbach ...................... 160/23.1 X |
| 3,292,684 | 12/1966 | Jiwes . |
| 4,442,881 | 4/1984 | Monteath et al. ................ 160/25 |
| 5,275,220 | 1/1994 | Siegal ............................ 160/24 |

FOREIGN PATENT DOCUMENTS

| | | | |
|---|---|---|---|
| 861879 | 2/1941 | France .......................... 160/313 |

*Primary Examiner*—David M. Purol
*Attorney, Agent, or Firm*—John J. Posta, Jr.

[57] ABSTRACT

The improved automatically retractable sun shade assembly includes a bracket having an elongated preferably detachable spine and a pair of connector holders at opposite ends of the spine and spaced forwardly thereof. The holders preferably have female slots therein in which are releasably received male connectors which include longitudinally aligned elongated extensions spaced from the spine, but parallel thereto. The facing ends of the extensions releasably hold opposite ends of an elongated closed loop rubber band which is twisted around its longitudinal axis. The rubber band is disposed in the central space of a hollow open ended tube parallel to but spaced from the spine. The open opposite ends of the tube slideably receive the extensions. The tube can rotate around the extensions. The tube has an opening in its sidewall through which a pin passes and is connected to the exterior of the tube. The pin passes between the two legs of the twisted rubber band to transmit the rotary force of the rubber band to the tube. A sun shade has one end connected to the exterior of the tube, the bodyof the shade being wrapped around the outside of the tube and the opposite free end bearing a hook or other retainer for releasably holding the shade in the extended operative position. The shade automatically retracts due to the rotary force of the rubber band. The assembly is light weight, inexpensive and durable.

12 Claims, 3 Drawing Sheets

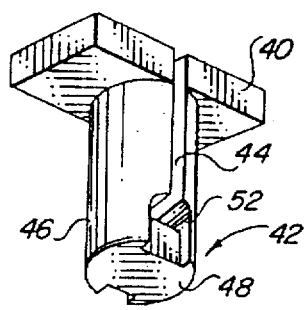
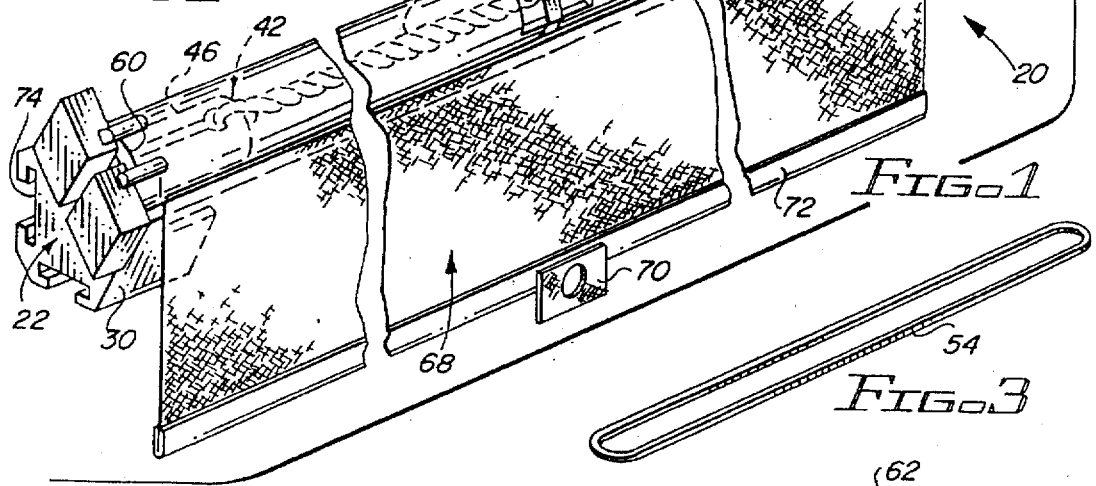
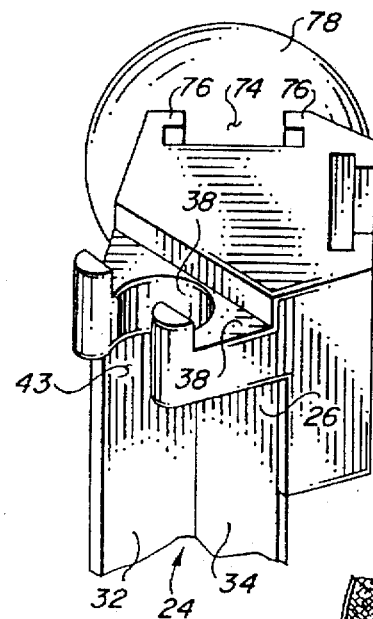
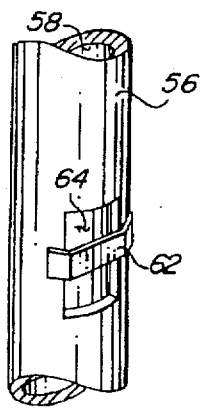
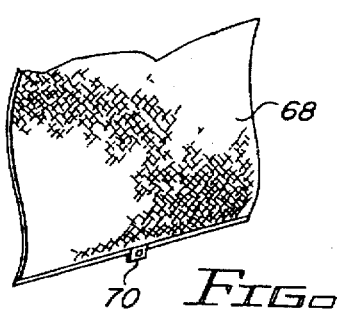

AUTOMATICALLY RETRACTABLE SUN SHADE ASSEMBLY

This is a continuation-in-part of U.S. patent application, Ser. No. 08/558,120, filed Nov. 13, 1995, now abandoned.

BACKGROUND OF THE INVENTION

1. Field of the Invention

The present invention generally relates to screening devices and more particularly to an improved form of a sun shade or viewing screen assembly.

2. Prior Art

Various types of sun shade assemblies have been constructed for home, office, automotive vehicle and other uses. Such assemblies are usually relatively heavy, large and cumbersome and expensive. They almost invariably employ heavy long coiled metal springs or other forms of metal springs which add to the weight of the finished assemblies and are difficult or impossible to replace if they break before or during use. Moreover, they are subject to rusting when used in outdoor locations.

In addition, because the springs are of large diameter, they are bulky and require bulky accessory equipment such as rollers and the like in which they may be installed. Moreover, because of their size and cost, certain applications for such assemblies are precluded by either cost or size of both.

Accordingly, there is a need for an improved sun shade assembly which is inexpensive, small, light in weight, durable and efficient and which can provide a smooth unwrapping and rewrapping action over a long period of time and which is not subject to breakage due to rust and other weathering. Moreover, there is a need for such an assembply which features easy and rapid replacement of the power means if and when it does wear out.

Such an assembly should also be useable in a variety of ancillary forms, such as wall partitions and dividers, curtain movers and the like.

SUMMARY OF THE INVENTION

The improved automatically retractable sun shade assembly of the present invention satisfies all the foregoing needs. Thus, the assembly is small, light in weight, campact and easily adaptable to various locations and applications, including its use as a drape or curtain mover, wall or area partition and the like.

It will be understood that although the assembly of the present invention is referred to hereinafter as a sun shade assembly it also has such ancillary or supplemental applications.

The improved assembly of the present invention is substantially as set forth in the ABSTRACT OF THE DISCLOSURE. Thus, the assembly comprises an elongated bracket which includes an elongated spine, to the opposite ends of which are integrally and/or releasably connected a pair of connector holders. These holders extend outwardly or forwardly of the spine and are parallel to each other.

Preferably, the holders have female-type recesses therein, in which are releasably received male connectors. The male connectors each include tubular extensions which are spaced from but face each other along a single longitudinal axis spaced from but parallel to the spine. The facing ends of the extensions releasably receive the opposite ends of a closed loop rubber band which is twisted around its longitudinal axis to provide rotary action for the assembly.

A hollow elongated tube which is preferably cylindrical and defines a central space extending the length thereof to the two open ends of the tube is slideably disposed around the extensions for rotation therearound. The tube includes the rubber band in the central space therein. A pin or tie is connected to both the rubber band and tube to impart rotary action to the tube from the rubber band.

Thus, the pin preferably passes between the two strands of the rubber band and out of the central space through a transverse opening in the sidewall of the tube to the exterior of the tube and is releasably locked thereto. The transverse opening preferably is at about the midpoint along the length of the tube.

One end of an elongated flexible resilient sun shade or divider is permanently connected to the exterior of the tube while the main body of the shade is wrapped around the exterior of the tube. The opposite free end of the shade bears a hook or other means for releasably retaining the shade in the extended operative position against the rotary force of the rubber band. When the retaining means is released, the shade automatically winds up around the tube, due to the rotation of the tube around the extensions, the rotation being effected by the twisted rubber band.

Thus, the rubber band causes smooth controlled unrolling and rolling up of the shade for the improved simplified operation of the assembly. The rubber band in the tube enables the tube to be more compact and light-weight and, accordingly, easier to attach the shade to the applying area firmly using hooks or other means.

The rubber band can be made of natural rubber, or synthetic rubber, or elastomer, or a composition of rubber and fabrics or fiber. More pairs of rubber bands (like 4 or 6 or 8) can be used to extend the rolling power and cover longer and a wider screen. The rubber band can be specifically made by a molding process so that an opening is provided with the band(s) itself to allow a pin to pass therethrough. It can be used in a variety of ancillary forms, such as wall partitions, dividers, curtain movers and the like.

A pair of the assemblies can be releasably connected together to extend the effective area covered by the shade thereof when extended to the operative position. Thus, in one embodiment of the invention, an array of two of the assemblies is releasably joined togehter back to back at the spines thereof so that the shades when extended face opposite directions. In another embodiment, the free ends of two shades are releasably joined together with the spines of the assemblies positioned remotely from each other, again to cover an extended area.

In another embodiment of the invention, each connector holder can have a spaced pair of the female openings on opposite sides of the holder, with separate connectors in the female openings supporting two separate parallel tubes containing rubber bands. Each such tube has one end of a separate shade connected to the exterior thereof, with the remainder of the shade wound around the tube's exterior. With this embodiment the two shades can be unwound in opposite directions from each other so as to be able to span a larger space than if only one shade were employed in the assembly.

Various other features of the improved assembly and arrays of the present invention are set forth in the following detailed description and accompanying drawings.

DRAWINGS

FIG. 1 is a schematic side perspective view, partly broken away, of a first preferred embodiment of the improved sun shade assembly of the present invention, showing the assembly with the sun shade thereof in the extended operative position;

FIG. 2 is an enlarged schematic side perspective view of one of the connector holders of FIG. 1;

FIG. 3 is a schematic side perspective view of a closed loop rubber band used in the assembly of FIG. 1;

FIG. 4 is a schematic front perspective view of a connector used in the assembly of FIG. 1;

FIG. 5 is a schematic front perspective view of a pin used in the assembly of FIG. 1;

FIG. 6 is a schematic front perspective view of a portion of the tube used in the assembly of FIG. 1, showing the pin in place connected to the tube;

FIG. 7 is a schematic side elevation of the sun shade of the assembly of FIG. 1;

DETAILED DESCRIPTION

FIGS. 1–8

Figure 8:
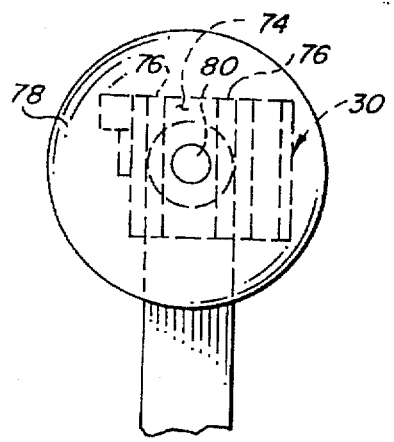
FIG. 8 is a schematic rear elevation of a connector holder and suction cup used in the assembly of FIG. 1.
Figure 10:
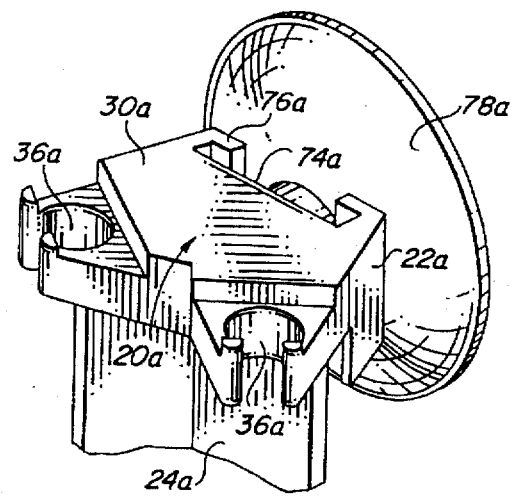
FIG. 10 is an enlarged schematic side perspective view of a connector holder for the assembly of FIG. 9.
Figure 9:
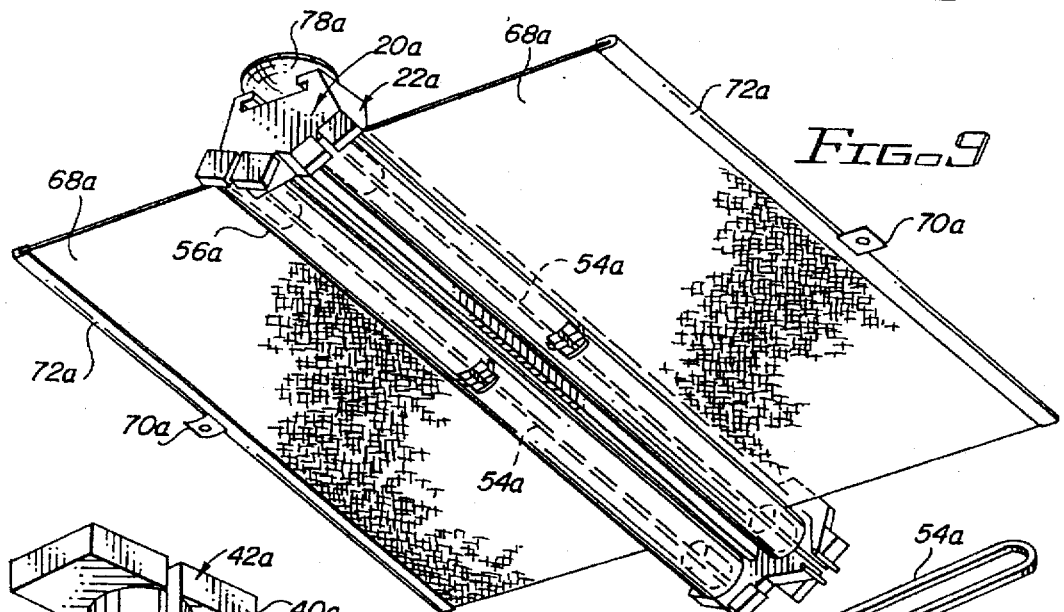
FIG. 9 is a schematic side perspective view of a second preferred embodiment of the improved sun shade assembly of the present invention, showing twin sun shades deployed in opposite directions from the connector holder of the assembly.
Figure 12:
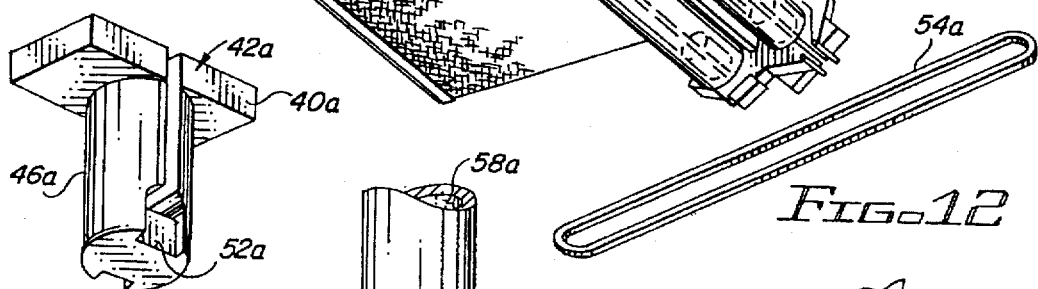
FIG. 12 is a schematic perspective view of a rubber band for the assembly of FIG. 9.
Figure 11:
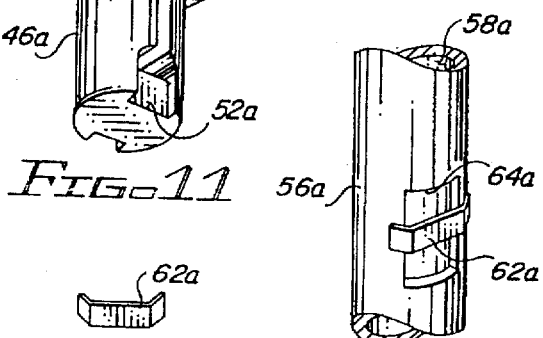
FIG. 11 is an enlarged schematic front perspective view of a connector for the assembly of FIG. 9.
Figures 13, 14, 15:
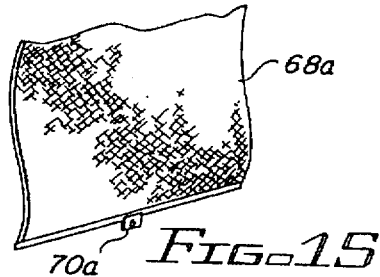
FIG. 13 is a schematic front perspective view of a pin for the assembly of FIG. 9.
FIG. 14 is a schematic front pespective view of the pin of FIG. 13 mounted on a portion of a tube of the assembly of FIG. 9.
FIG. 15 is a schematic side elevation of one of the sun shade used in the assembly of FIG. 9; and, FIG. 16 is an enlarged schematic fragmentary front elevation of the spine used in the assembly of FIG. 9.

Now referring more particularly to FIGS. 1–8 of the drawings, a first preferred embodiment of the improved automatically retractable sun shade assembly of the present invention is schematically depicted therein. Thus, assembly 20 is shown, which comprises a bracket 22 having a flat L-shaped elongated spine 24 to the opposite ends 26 and 28 thereof are integrally secured connector holders 30. It is preferred that spine 24 include, as shown in FIG. 2 particularly, a first flat plate 32 and a second flat plate 34 connected together at a side edge thereof to form a right angled L-shaped or C-shaped configuration. It will be understood that, if desired, spine 24 could be a single flat plate, such as plate 34, Connector holders 30 slideably or permanently receive the opposite ends of plates 32 and 34. Connector holders 30 each define a cylindrical central opening 36 extending therethrough and spaced from plates 32 and 34. Openings 36 are along a single longitudinal axis parallel to but spaced from plates 32 and 34. Holders 30 each define a top female slot or recess 38 intersecting opening 36 and within which the rectangular head 40 of a male connector 42 is releasably received. An auxiliary slot 43 intersects slot 38 at a right angle thereto in each holder 30 for insertion of a rubber band 54 as a power means therethrough, as described hereinafter.

Each connector 42 also includes a tubular extension 46 connected to the inner surface of head 40 and the free end 48 of which defines an opening 52 to hold one end of elongated closed loop rubber band 54. Connector 42 may be split down through slot 44 to opening 52 to permit rubber band 54 to be inserted thereinto (see FIG. 4).

Rubber band 54 is twisted around its longitudinal axis to establish its ability to rotate, as hereinafter more fully described. Assembly 20 also includes a hollow generally cylindrical tube 56 of plastic, metal, such as brass, aluminum, steel or the like. Tube 56 has a central space 58 and open opposite ends 60 communicating with space 58. Ends 60 are dimensioned to slideably receive extensions 46 and to freely rotate therearound. Tube 56 is of sufficient length to approximate the adjacent inner surfaces of connector heads 40 and of a diameter to be spaced, when in place in bracket 22, away from plates 32 and 34.

Tube 56 is connected to rubber band 54 which is held in space 58 by extensions 46. Thus, a pine or plate 62 can be inserted between the two strands of rubber band 54 and passed out of tube 56 through a transverse slot 64 at about the midpoint along the length thereof and releasably secured to the outer surface of tube 56, as shown in FIG. 6.

In assembling assembly 20, first rubber band 54, connectors 42 and tube 56 are assembled, and then both connectors 42 are rotated in the same direction after pin or plate 62 is locked to rubber band 54 and tube 56, after which the twisted rubber band 54 is passed through slots 43 and attached connectors 42 are seated in slots 38 with extensions 46 inserted through openings 36 and into ends 60 of tube 56 to the position shown in FIG. 1.

One end 66 of rectangular sun shade 68 is then glued or otherwise permanently attached to the outer surface of tube 56 with tube 56 rotated to place it under rotating force from rubber band 54, so that on releasing tube 56 shade 68 winds or wraps around the outside of tube 56 to the stored position. When shade 68 is unwound, it is unwound against the rotating force transmitted from rubber band 54 to tube 56, so that when the unwound shade 68 is released, it will automatically rewind to the stored position. The rotating force exerted by rubber band 54 is smooth and even.

In order to hold shade 68 in the operative deployed position of FIG. 7, an eye-bearing tab 70 may be connected to free end 72 of shade 68, which tab 70 can releasably engage engage retainer means such as a hook retainer (not shown). As shown in FIG. 2, each connector holder 30 defines a vertical slot 74 with side retaining lips 76 releasably holding a suction cup 78 by its round center base 80 (FIG. 8). Cup 78 releasably secures assembly 20 in place against a surface. Other releasable retaining means (not shown) for assembly 20, such as tacky adhesive strips, hooks, etc., could be employed in place of cup 78.

Thus, an improved sun shade assembly is provided. Assembly 20 can be made in any desired size and of light weight durable materials such as metal, plastic or the like. In the embodiment shown in FIGS. 1–8 of the drawings, a tube 56 and pin 62 are made of metal, or aluminum, or plastic, and shade 68 is of cloth, plastic film, non-woven fabric or synthetic paper, and the remainder of the components of assembly 20 are of plastic, aluminum, or the like, except for rubber band 54. Assembly 20 can be used inside or outside, in automotive vehicles, offices, factories, homes, etc., eitehr as a sun shade or as a view-blocking partition or the like.

FIGS. 9–16

A second preferred embodiment of the improved sun shade assembly of the present invention is schematically depicted in FIGS. 9–16. Thus, assembly 20a is shown. Components thereof similar to those of assembly 20 bear the same numerals but are succeeded by the letter "a".

FIG. 17

An alternative type of rubber band can be employed for the rotary power source, such as the band 54b. This band is formed in the original molding process with opening 55 therein, the pin or plate 62 (FIG. 6) can pass through this opening 55 to more securely position the band 54b relative to tube 56.

FIG. 18

Figure 18:
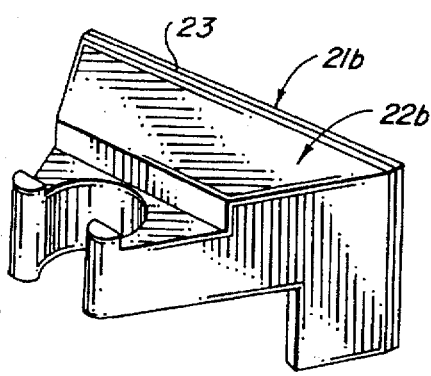
FIG. 18 is a perspective view of an alternative design of the mounting bracket.
Figure 19:
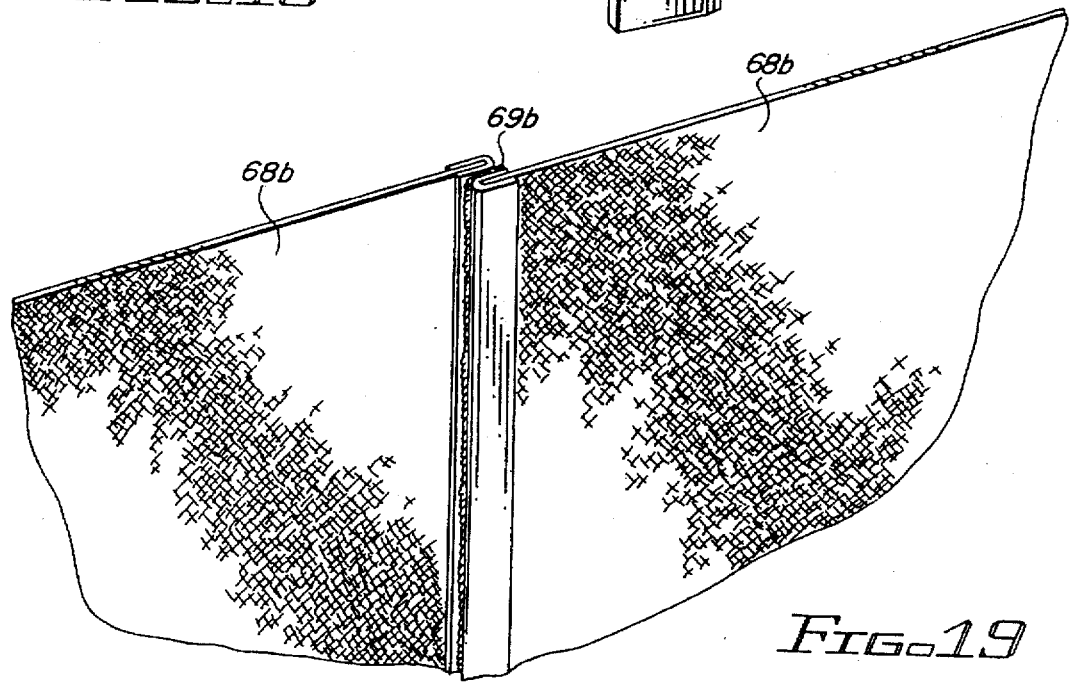
FIG. 19 is a perspective view of the shades connected together at their free ends.

FIG. 2 discloses a bracket 22 with a slot 74 and side retaining slips 76 for attaching the shade to a suction cup 78. If desired, bracket 22 can be made without the slot 74 and lips 76; i.e., with a flat surface 21b, as shown in FIG. 18. Surface 21b can carry an adhesive, hook and pile, or any other flat surface securing means when it is desired to use other means to connect the assembly to a flat surface.

FIG. 19

As shown in this figure, two assemblies can be spaced apart from one another and have the free ends of the shades 68b and 68c releasably secured when in the extended position by suitable well known fastening means, such as clips, hook and pile, etc., when an extended surface area needs to be covered.

Figure 16:
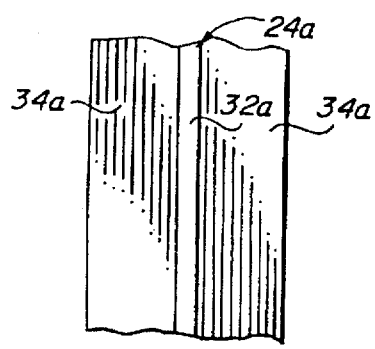
Figure 17:
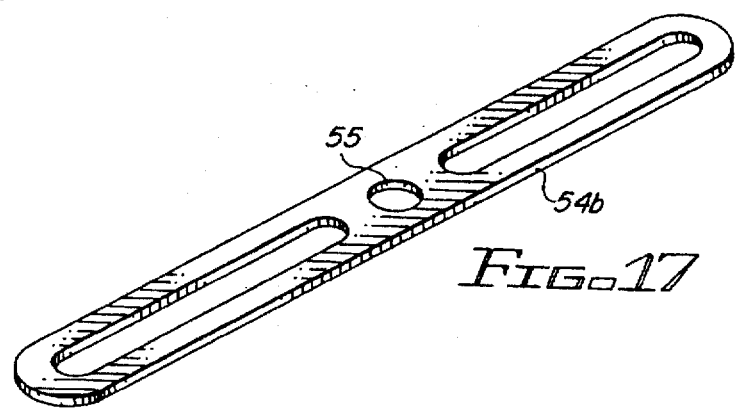
FIG. 17 is a perspective view of an alternative design of the rubber band.

Assembly 20a is substantially identical to assembly 20, except as follows:

a) Spine 24a is T-shaped in plan view with a central flat plate 32a projecting forwardly of an integral flat rear plate 34a extending at a right angle, as shown in FIG. 16;

b) Connector holders 30a define a spaced parallel pair of vertical openings 36a on opposite sides thereof in which are releasably seated spaced parallel connectors 42a, to which are releasably slideably connected a pair of spaced parallel vertical tubes 56a containing rubber bands 54a; and, c) Tubes 56a each bear one end of a separate sun shade 68a, tubes 56a being adapted to deploy sun shades 68a from opposite sides of assembly 20a and to retract, that is, rewind shades 68a about their exteriors by rubber band-induced rotation in opposite directions from each other. Thus, assembly 20a permits one or both sun shades 68 a to be unwound to span a desired space.

Accordingly, assembly 20a has the advantages of assembly 20 but also has increased adaptability to a variety of applications.

Various modifications, changes, alterations and additions can be made in the improved assembly of the present invention, its components and parameters. All such changes, modifications, alterations and additions as are within the scope of the appended claims form part of the present invention.

What is claimed is:

1. An improved automatically retractable sun shade assembly, said assembly comprising, in combination:

a) an elongated bracket having a longitudinally extending spine with two opposite ends and connector holders secured to said opposite ends and extending forwardly thereof;

b) a rubber band twisted around its longitudinal axis to provide a rotary force;

c) connectors releasably disposed in said connector holders and spaced from said spine, each said connector having a tubular extension spaced forwardly from but parallel to said spine, said extensions being spaced from but facing each other along a single longitudinal axis and releasably securing opposite ends of said rubber band;

d) a generally cylindrical tube having a central space extending the length thereof, said tube having open opposite ends slideably secured around said extensions said central space containing said rubber band, said tube being spaced from but parallel to said spine;

e) a pin secured to said rubber band and to said tube to transmit said rotary force from said rubber band to said tube; and, f) an elongated flexible sun shade having one end thereof secured to the exterior of said tube and an opposite free end, the remainder of said shade being wrapped around said tube, whereby pulling said free end to unwrap said shade operates against the rotary force of said rubber band so that when said free end is released said sun shade automatically rewraps around said tube.

2. The improved sun shade assembly of claim 1 wherein said free end of said sun shade includes retainer means for releasably holding said sun shade in the extended unwrapped operative position.

3. The improved sun shade assembly of claim 1 wherein said rubber band includes two spaced elongated segments and wherein said pin is placed between said segments and extends out of said tube to the exterior thereof through an opening at about the midpoint along the length of said tube, said pin being connected to the exterior of said tube.

4. The improved sun shade assembly of claim 1 wherein said connector holders include female recesses and wherein said connectors comprise male heads releasably fitting within said female recesses.

5. The improved sun shade asssembly of claim 1 wherein the exterior of said bracket includes means for releasably connecting said bracket to a surface.

6. The improved sun shade assembly of claim 1 wherein the connector has an opening to permit the rubber band to be inserted therein.

7. The improved sun shade assembly of claim 1 wherein said spine is releasably secured in slots defined in said connectors.

8. The improved sun shade assembly of claim 7 wherein said spine is L-shaped in plan view.

9. An improved automatically retractable sun shade assembly, said assembly comprising, in combination:

a) an elongated bracket having a longitudinally extending spine with two opposite ends and connector holders secured to said opposite ends and extending forwardly thereof, the exterior of the bracket including means for releasably connecting said bracket to a surface, and wherein said bracket exterior defines a rear groove within which is releasably received the base of a suction cup extending rearwardly of said bracket for connection to a surface;

b) a rubber band twisted around its longitudinal axis to provide a rotary force;

c) connectors releasably disposed in said connector holders and spaced from said spine, each said connector having a tubular extension spaced forwardly from but parallel to said spine, said extensions being spaced from but facing each other along a single longitudinal axis and releasably securing opposite ends of said rubber band;

d) a generally cylindrical tube having a central space extending the length thereof, said tube having open opposite ends slideably secured around said extensions said central space containing said rubber band, said tube being spaced from but parallel to said spine;

e) a pin secured to said rubber band and to said tube to transmit said rotary force from said rubber band to sid tube; and, f) an elongated flexible sun shade having one end thereof secured to the exterior of said tube and an opposite free end, the remainder of said shade being wrapped around said tube, whereby pulling said free end to unwrap said shade operates agaist the rotary force of said rubber band so that when said free end is released said sun shade automatically rewraps around said tube.

10. An improved automatically retractable sun shade assembly, said assembly comprising, in combination:

a) an elongated bracket having a longitudinally extending spine with two opposite ends and connector holders secured to said opposite ends and extending forwardly thereof;

b) a rubber band twisted around its longitudinal axis to provide a rotary force;

c) connectors releasably disposed in said connector holders and spaced from said spine, each said connector having a tubular extension spaced forwardly from but parallel to said spine, said extensions being spaced from but facing each other along a single longitudinal axis and releasably securing opposite ends of said rubber band;

d) a spaced pair of generally cylindrical tubes, each said tube having a central space extending the length thereof, said tube having open opposite ends slideably secured around said extensions said central space containing said rubber band, said tube being spaced from but parallel to said spine, said spaced pair of tubes being secured to said connector extensions on said opposite sides and parallel to but spaced from each other, and wherein a spaced pair of said sun shades are connected to said tubes for deploying in opposite directions from each other.

11. The improved sun shade assembly of claim 10 wherein said spine is generally T-shaped in plan view.

12. An improved automatically retractable sun shade array, said array comprising, in combination, a pair of sun shade assemblies, each said assembly comprising, in combination:

a) an elongated bracket having a longitudinally extending spine with two opposite ends and connector holders secured to said opposite ends and extending forwardly thereof;

b) a rubber band twisted around its longitudinal axis to provide a rotary force;

c) connectors releasably disposed in said connector holders and spaced from said spine, each said connector having a tubular extension spaced forwardly from but parallel to said spine, said extensions being spaced from but facing each other along a single longitudinal axis and releasably securing opposite ends of said rubber band;

d) a generally cylindrical tube having a central space extending the length thereof, said tube having open opposite ends slideably secured around said extensions said central space containing said rubber band, said tube being spaced from but parallel to said spine;

e) a pin secured to said rubber band and to said tube to transmit said rotary force from said rubber band to said tube; and, f) an elongated flexible sun shade having one end thereof secured to the exterior of said tube and an opposite free end, the remainder of said shade being wrapped around said tube, whereby pulling said free end to unwrap said shade operates against the rotary force of said rubber band so that when said free end is released said sun shade automatically rewraps around said tube, said free ends of said sun shades being releasably connected together and with said brackets disposed remotely from each other.

* * * * *